United States Patent
Oh et al.

(10) Patent No.: US 8,027,414 B2
(45) Date of Patent: Sep. 27, 2011

(54) CARRIER FREQUENCY RECOVERING APPARATUS USING PHASE SHIFT AND METHOD THEREOF

(75) Inventors: Jung-Yeol Oh, Daejeon (KR); Jae-Young Kim, Daejeon (KR); Byung-Jae Kwak, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1127 days.

(21) Appl. No.: 11/691,057

(22) Filed: Mar. 26, 2007

(65) Prior Publication Data

US 2008/0101508 A1      May 1, 2008

(30) Foreign Application Priority Data

Oct. 26, 2006   (KR) .................. 10-2006-0104610

(51) Int. Cl.
*H04L 27/06* (2006.01)
(52) U.S. Cl. ........ 375/344; 375/326; 375/316; 375/375; 455/164.1; 455/164.2; 455/192.1; 455/192.2
(58) Field of Classification Search .................. 375/344, 375/326, 316, 375; 455/164.1, 164.2, 192.1, 455/192.2
See application file for complete search history.

(56) References Cited

U.S. PATENT DOCUMENTS

| | | | |
|---|---|---|---|
| 6,590,945 B1* | 7/2003 | Brardjanian et al. | 375/340 |
| 7,477,707 B2* | 1/2009 | Kazi et al. | 375/330 |
| 7,634,000 B1* | 12/2009 | Karthik et al. | 375/227 |
| 2002/0172187 A1* | 11/2002 | Shalvi et al. | 370/350 |
| 2004/0081247 A1* | 4/2004 | Chang et al. | 375/259 |
| 2004/0146122 A1 | 7/2004 | Fague et al. | |
| 2005/0207519 A1 | 9/2005 | Phang et al. | |
| 2006/0007904 A1* | 1/2006 | Shimomura et al. | 370/342 |
| 2006/0222095 A1* | 10/2006 | Niu et al. | 375/260 |

FOREIGN PATENT DOCUMENTS

| | | |
|---|---|---|
| JP | 05-235923 | 9/1993 |
| KR | 20030064613 | 8/2003 |
| KR | 10-2005-0067326 | 7/2005 |
| KR | 10-2006-0038137 | 5/2006 |
| KR | 200427981 | 9/2006 |

* cited by examiner

*Primary Examiner* — Chieh M Fan
*Assistant Examiner* — Siu Lee
(74) *Attorney, Agent, or Firm* — Ladas & Parry LLP

(57) ABSTRACT

Provided is a carrier frequency recovering apparatus and method based on phase shift. The carrier frequency recovering apparatus can recover carrier frequency based on phase shift caused by a frequency offset to thereby perform demodulation without deterioration, no matter how large the frequency offset is, and minimize structural complexity, although a frequency offset tolerance range is higher than a symbol rate and a method thereof. The carrier frequency recovering apparatus includes a phase shift estimation part for estimating a phase shift value caused by a frequency offset based on a received preamble signal; a compensation part for compensating a receiving signal based on the estimated phase shift value obtained in the phase shift estimation part prior to differential decoding; and a detection part for detecting the compensated signal obtained in the compensation part.

7 Claims, 10 Drawing Sheets

(REALTED ART)

CARRIER FREQUENCY RECOVERING APPARATUS USING PHASE SHIFT AND METHOD THEREOF

CROSS-REFERENCE(S) TO RELATED APPLICATIONS

The present invention claims priority of Korean Patent Application No. 10-2006-0104610, filed on Oct. 26, 2006, which is incorporated herein by reference.

BACKGROUND OF THE INVENTION

1. Field of the Invention

The present invention relates to an apparatus and method for recovering a carrier frequency of a receiving signal in a wireless packet communication system using differential decoding; and, more particularly, to a carrier frequency recovering apparatus and method that can perform demodulation without deterioration, no matter how large a frequency offset is, and minimize structural complexity, although a frequency offset tolerance range is higher than a symbol rate, just as a Direct Sequence Spread Spectrum (DSSS) Differential Binary Phase Shift Keying (DBPSK) system in a low-rate personal wireless communication network following IEEE 802.15.4 Specification.

2. Description of Related Art

Using a crystal oscillator with a high-precision property is very effective in the respect of reducing frequency offsets caused by errors of the oscillator between a transmitter and a receiver of a wireless communication system. The cost for a crystal oscillator generally accounts for less than 1% of the entire material costs of a common communication device or a household electronic product, such as a mobile phone and a television (TV) set.

However, the cost for a crystal oscillator reaches up to 10% of the entire material costs for each unit product in a system having low-cost and low-data transmission rate as its mottos, such as a Low-Rate Wireless Personal Area Network (LR-WPAN) defined in an IEEE 802.15.4 Specification. Traditionally, TVs and FM radios employ an RF receiver without a crystal oscillator. Since a communication system without a crystal oscillator has a relatively wide transmission bandwidth, compared to the transmission frequency, or it requires manual frequency tuning from a user, it is not appropriate as a modern communication system.

These days, the LR-WPAN system for a low-cost sensor node apparatus that has a receiver without a crystal oscillator comes into the limelight. The LR-WPAN based on the IEEE 802.15.4 defines a carrier frequency offset tolerance value of ±40 ppm, which is a rather large value, to minimize complexity in realization.

In a general Direct Sequence Spread Spectrum (DSSS) system, there is a pilot channel and frequency is recovered by estimating frequency and phase offsets based on pilot signals received through the pilot channel and using a Phase Lock Loop (PLL). The structure has an advantage that frequency and phase offsets are accurately estimated. Thus, it is proper to coherent demodulation.

However, a packet communication system, such as the LR-WPAN system, can hardly support an additional pilot channel. Thus, if there is a preamble, the system should seek to estimate and compensate for a frequency offset by using the preamble. Herein, when differential decoding is used instead of coherent demodulation, the receiver can be simplified and the effect of frequency offset can be reduced.

Differential phase Shift Keying (PSK) is a technology for recovering signals by using a delay value of a previous symbol and phase information of a current symbol. Generally, the receiver using differential decoding has a property that it is robust to phase shift of a small range, which is caused among adjacent symbols, and it can also reduce the effect of phase noise.

The frequency offset tolerance value can be obtained more in differential chip detection (DCD) where signals are detected at a chip level than in differential symbol detection (DSD) where signals are detected at a symbol level.

A LR-WPAN Standard technology following the IEEE 802.15.4 Specification supports a low-rate data service as fast as 20 Kbps/40 Kbps by using a DSSS Differential Binary Phase Shift Keying (DBPSK), which is a symbol level modulation method, in a band of 868 MHz to 915 MHz. The frequency offset tolerance value is ±40 ppm for each of a transmitter and a receiver, and it is ±80 ppm (160 ppm) for the entire system.

The frequency offset tolerance value signifies that frequency offsets are tolerable in a range of 69 KHz to 73 KHz in the band of 868 MHz to 915 MHz. The tolerance value is about two to three times as high as the symbol transmission rate. Thus, it is difficult to synchronize signal reception by using a general frequency recovering method. Although a conventional differential demodulation may be adopted, it deteriorates performance and makes the structure of a receiver complicated. In addition, it increases the costs.

According to the conventional coherent frequency offset estimation apparatus estimates frequency offsets by using the currently received signals, provides the frequency offset estimation information to an oscillator, and multiplies inputted signals by the frequency offset estimation information to thereby compensate for the frequency offset in a low pass filter. An example of the conventional coherent frequency offset estimation apparatus will be described hereafter with reference to FIG. 1.

FIG. 1 is a schematic diagram illustrating a conventional frequency recovering apparatus using a Costas loop. It describes how a carrier is recovered through the Costas loop in a synchronous communication system.

Referring to FIG. 1, receiving signals are multiplied by an orthogonal carrier of a frequency offset component estimated in a numerically controlled oscillator (NCO) 103 at multipliers 100, 101, 102 and 104. Subsequently, offset signals are acquired through an adder 105 and a subtracter 106. The offset signals are multiplied by the outputs of two low pass filters (LPF) 107 and 108 and then filtered in a loop filter 109 to thereby produce an estimated frequency offset. The estimated frequency offset is fed back to the numerically controlled oscillator 103 and drives the numerically controlled oscillator 103.

However, the range of the maximum frequency offset that can be estimated depends on the symbol transmission rate. When the DCD method is used, the range can be extended as much as the chip rate. However, since the DSSS DBPSK method of the LR-WPAN following the IEEE 802.15.4 Specification uses the DSD method, the frequency offset compensation performance is deteriorated remarkably.

SUMMARY OF THE INVENTION

An embodiment of the present invention is directed to providing a carrier frequency recovering apparatus that can recover carrier frequency based on phase shift caused by a frequency offset to thereby perform demodulation without deterioration, no matter how large the frequency offset is, and minimize structural complexity, although a frequency offset tolerance range is higher than a symbol transmission rate, and a method thereof.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

In accordance with an aspect of the present invention, there is provided an apparatus for recovering a carrier frequency based on phase shift, which includes; a phase shift estimation part for estimating a phase shift value caused by a frequency offset based on a received preamble signal; a compensation part for compensating a receiving signal based on the estimated phase shift value obtained in the phase shift estimation part prior to differential decoding; and a detection part for detecting the compensated signal obtained in the compensation part after differential decoding.

In accordance with another aspect of the present invention, there is provided an apparatus for recovering a carrier frequency based on phase shift, which includes: a phase shift estimation part for estimating a phase shift value caused by a frequency offset based on a received preamble signal; a compensation part for compensating a decoded signal based on the estimated phase shift value acquired in the phase shift estimation part after differential decoding; and a detection part for detecting the compensated signal obtained in the compensation part.

In accordance with another aspect of the present invention, there is provided a method for recovering a carrier frequency based on phase shift, which includes the steps of: a) estimating a phase shift value caused by a frequency offset based on a received preamble signal; b) compensating a receiving signal based on the estimated phase shift value prior to differential decoding; and c) detecting the compensated signal after differential decoding.

In accordance with another aspect of the present inventions there is provided a method for recovering a carrier frequency based on phase shift, which includes the steps of: a) estimating a phase shift value caused by a frequency offset based on a received preamble signal; b) compensating a decoded signal based on the estimated phase shift value after differential decoding; and c) detecting the compensated signal.

DESCRIPTION OF SPECIFIC EMBODIMENTS

The advantages, features and aspects of the invention will become apparent from the following description of the embodiments with reference to the accompanying drawings, which is set forth hereinafter. Also, when it is considered detailed description on a related art may obscure the points of the present invention, the description will not be provided herein. Hereinafter, preferred embodiments of the present invention will be described in detail with reference to the accompanying drawings.

Figure 1:
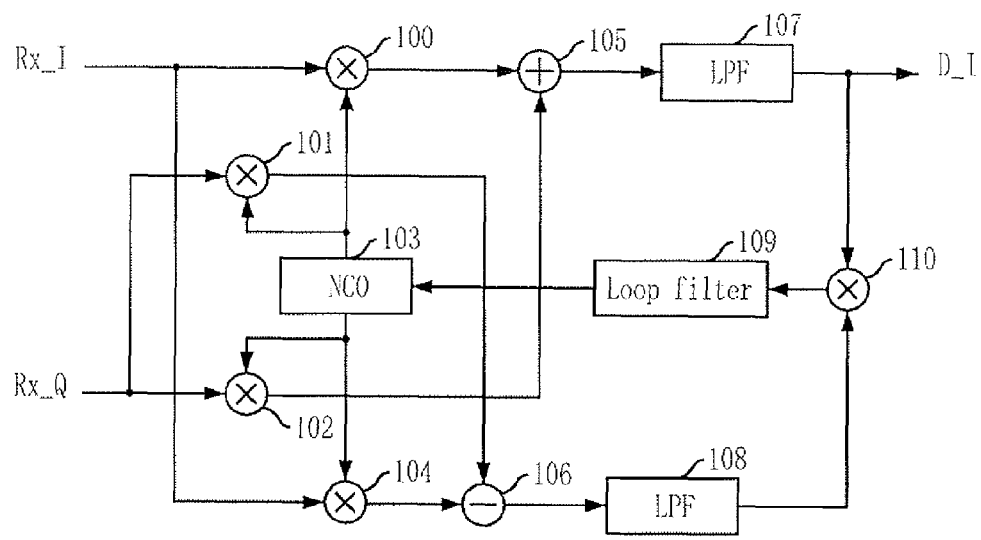
FIG. 1 is a schematic diagram illustrating a conventional frequency recovering apparatus using a Costas loop.
Figure 2:
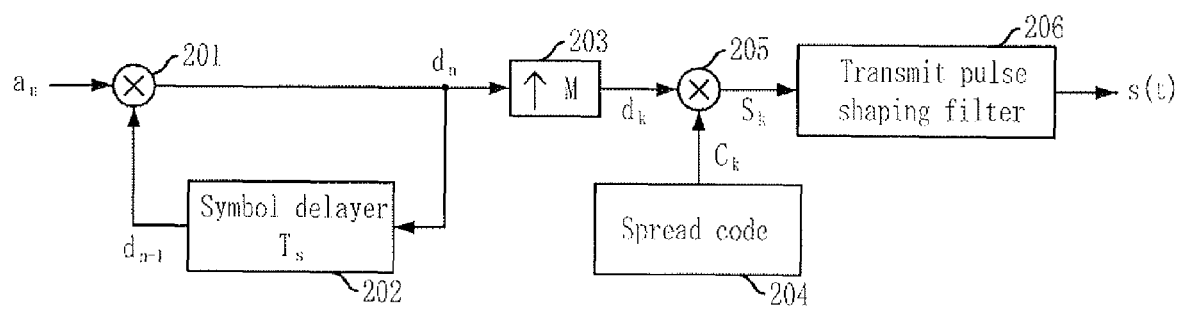
FIG. 2 is a schematic diagram illustrating a transmission part of a conventional Direct Sequence Spread Spectrum (DSSS) Differential Binary Phase Shift Keying (DBPSK) system.
Figure 3:
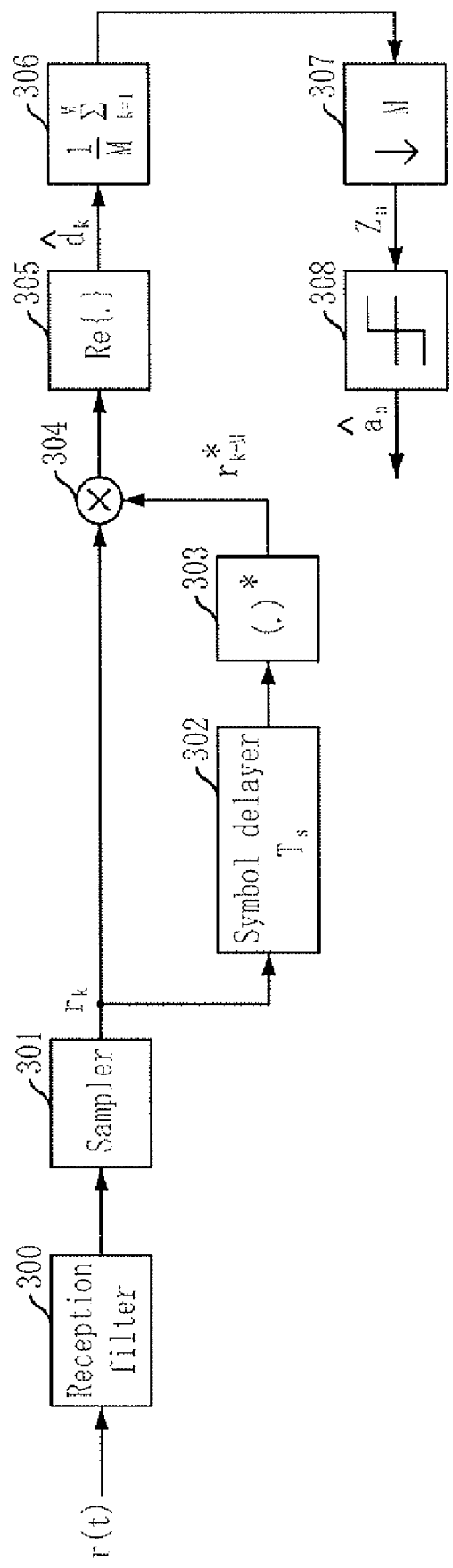
FIG. 3 is a schematic diagram illustrating a receiver of the DSSS DBPSK system.

The present invention adopts a differential detection method in which a transmitting part differentially encodes and transmits signals and a receiver differentially decodes the signals in a differential decoder. Referring to FIGS. 2 and 3, a modulation part and a demodulation part of a general Direct Sequence Spread Spectrum (DSSS) Differential Binary Phase Shift Keying (DBPSK) system will be described. The DSSS DBPSK system is a binary differential Phase Shift Keying (PSK) system with a direct spreading method applied thereto.

FIG. 2 is a schematic diagram illustrating a transmission part of a conventional DSSS DBPSK system. FIG. 3 is a schematic diagram illustrating a receiver of the DSSS DBPSK system.

When a differentially encoded sequence is $d_n$ and a message sequence to be transmitted is $a_n$, a differentially encoded current bit $d_n$ is acquired by multiplying a current message $a_n$ by a differentially encoded bit $d_{n-1}$ obtained from a symbol delayer 202 in a multiplier 201, which is expressed as the following Equation 1.

$$d_n = d_{n-1} \cdot a_n \qquad \text{Equation 1}$$

Subsequently, the differentially encoded current bit $d_n$ is over-sampled by a factor M in an up-sampler 203 and goes through DSSS modulation in a modulator 205 based on a spread code ($C_k$) 204 having M chips. The DSSS-modulated bit passes through a transmit pulse shaping filter with raised cosine response $p_t(t)$ 206, transformed into an analog signal, and transmitted. Herein, the transmitting signal s(t) can be expressed as the following Equation 2.

$$s(t) = \sqrt{2E_c} \sum_k s_k p_T(t - kT_c) \qquad \text{Equation 2}$$

where $E_c$ is the energy of a chip and $$E_c = \frac{1}{M}E_b;$$

$E_b$ is the energy of a bit or Symbol;
$P_T$ is a transmit pulse shaping filter;
t is a continuous time index;
$s_k$ is a resulting chip-rate sequence;
k is a discrete time index; and
$T_c$ is a time interval between chip sequences.

A receiving signal r(t) is expressed in the form of a complex number as the following Equation 3.

$$r(t)=e^{j\partial(t)}s(t-\tau)+n(t) \qquad \text{Equation 3}$$

where $\partial(t)$ is a combined phase signal obtained based on discrepancy of a local oscillator;
$\tau$ is an arrival time delay at the receiver; and
n(t) is a complex Additive White Gaussian Noise (AWGN) having a two-sided power spectral density of $N_0/2$.

A receiving signal received in the receiver passes through a reception filter 300, and sampled in a sampler 301 at a synchronized chip space. The averaged receiving signal $r_k$ is expressed in a complex number, which is shown in Equation 4.

$$r_k=e^{j(2\pi k\Delta fT_c+\theta)}s_k+n_k \qquad \text{Equation 4}$$

where $\Delta f$ is a carrier frequency offset applied between a transmitter and a receiver;
k is a discrete time index
$T_c$ is a time interval between chip sequences.
$s_k$ is a resulting chip-rate sequence;
$n_k$ is a sampled version of complex Additive White Gaussian Noise (AWGN); and
$\theta$ is an initial phase value uniformly distributed from 0 to $2\pi$.

The receiving signal is delayed in a symbol delayer 302 by a symbol length and outputted. The delayed symbol is transformed into a complex conjugate in a conjugator 303 and multiplied by a currently received signal in a multiplier 304. When demodulation is performed onto the complex conjugate of the delayed symbol obtained in the conjugator 303 and the current symbols in the multiplier 304, the real part $\hat{d}_k$ of the demodulated value obtained in a real part extractor 305 is expressed as Equation 5.

$$\begin{aligned}\hat{d}_k &= \text{Re}\{r_k r_{k-M}^*\} \\ &= \text{Re}\{s_k s_{k-M}^* e^{j2\pi M\Delta fT_c} + \\ &\quad n_k s_{k-M}^* e^{(-j2\pi(k-M)\Delta fT_c+\theta)} + \\ &\quad s_k n_{k-M}^* e^{(j2\pi k\Delta fT_c+\theta)} + n_k n_{k-M}^*\}\end{aligned} \qquad \text{Equation 5}$$

where M is the length of a spread code;
$s_k$ is a resulting chip-rate sequence;
$\Delta f$ is a frequency offset value applied between a transmitter and a receiver;
$T_c$ is a time interval between chip sequences;
$n_k$ is a sampled version of complex Additive White Gaussian Noise (AWGN); and
$\theta$ is an initial phase value uniformly distributed from 0 to $2\pi$.

Subsequently, the real parts are accumulated as many as the length of the spread code, i.e., the number of chips of the spread code, in an accumulator 306, and down-sampled in M folds in a down-sampler 307 and outputs the down-sampled bit into a signal value detector 308. When the noise effect $n_k$ is excluded, a signal affected by a frequency offset can be expressed as Equation 6.

$$\begin{aligned}z_n &= \frac{1}{M}\sum_M \text{Re}\{s_k s_{k-M}^* e^{j2\pi M\Delta fT_c}\} \\ &= \hat{a}_n\cos(2\pi\Delta fT_s)\end{aligned} \qquad \text{Equation 6}$$

where M the length of a spread code;
$s_k$ is a resulting chip-rate sequence;
$\Delta f$ is a frequency offset value applied between a transmitter and a receiver;
$T_c$ is a time interval between chip sequences;
$\hat{a}_n$ is an estimated information sequence estimated in a receiver; and
$T_s$ is a symbol time interval.

When there is noise, the effect of a frequency offset is expressed in a similar way.

Figure 4:
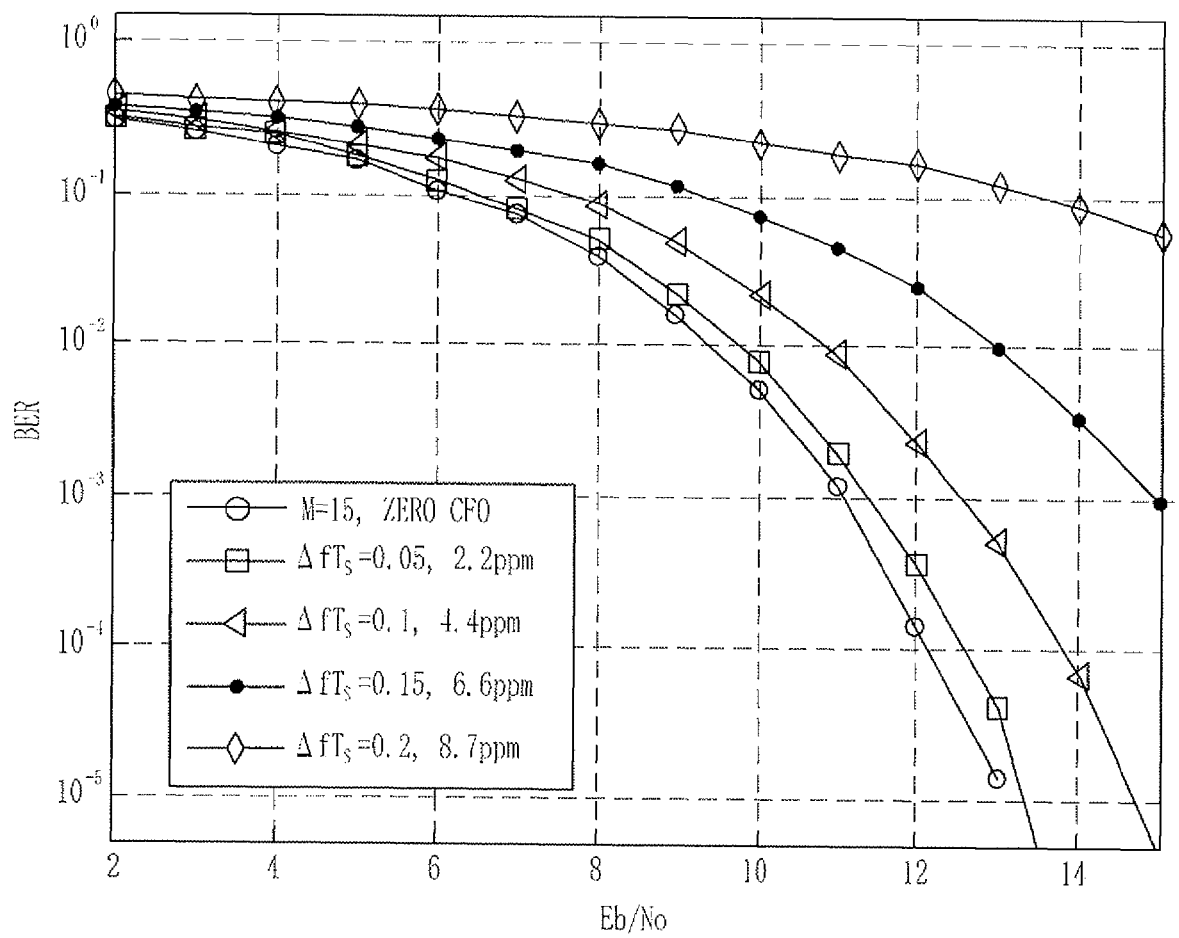
FIG. 4 is a graph showing a performance simulation result of a conventional differential decoding method.

FIG. 4 is a graph showing a performance simulation result of a conventional differential decoding method. It shows the performance of a receiver of the DSSS DBPSK system following the IEEE 802.15.4 Standard on carrier frequency offset.

The simulation result shown in FIG. 4 is acquired when the length of a spread code M is 15; a carrier frequency is 915 MHz; and an averaged frequency offset ranges from 0 ppm to 8.7 ppm. It can be seen from the graph that when the frequency offset value is controlled to be within a symbol space of $0.2\pi$, the performance of the receiver is deteriorated to an extent lower than 1 dB, which is a 10% of a symbol rate. When frequency offset occurs more than 20% of the symbol rate, serious errors is caused. A conventional frequency offset estimating method and apparatus adopting coherent demodulation estimates the frequency offset value and compensates for the frequency offset by multiplying the estimated frequency offset value by input signals as much as frequency offset generated in the NCO. The conventional method, however, limits the frequency offset estimation range into the symbol rate due to the phase ambiguity of modulo $2\pi$, which is expressed as Equation 7.

$$\Delta f<|0.5\cdot T_s| \qquad \text{Equation 7}$$

where $\Delta f$ is a frequency offset value applied between a transmitter and a receiver; and
$T_s$ is a symbol time interval.

Whereas the conventional method estimates the frequency offset value applied to a receiving signal, the method and apparatus of the present invention recovers carrier frequency by using only phase shift caused by a frequency offset.

Figure 5:
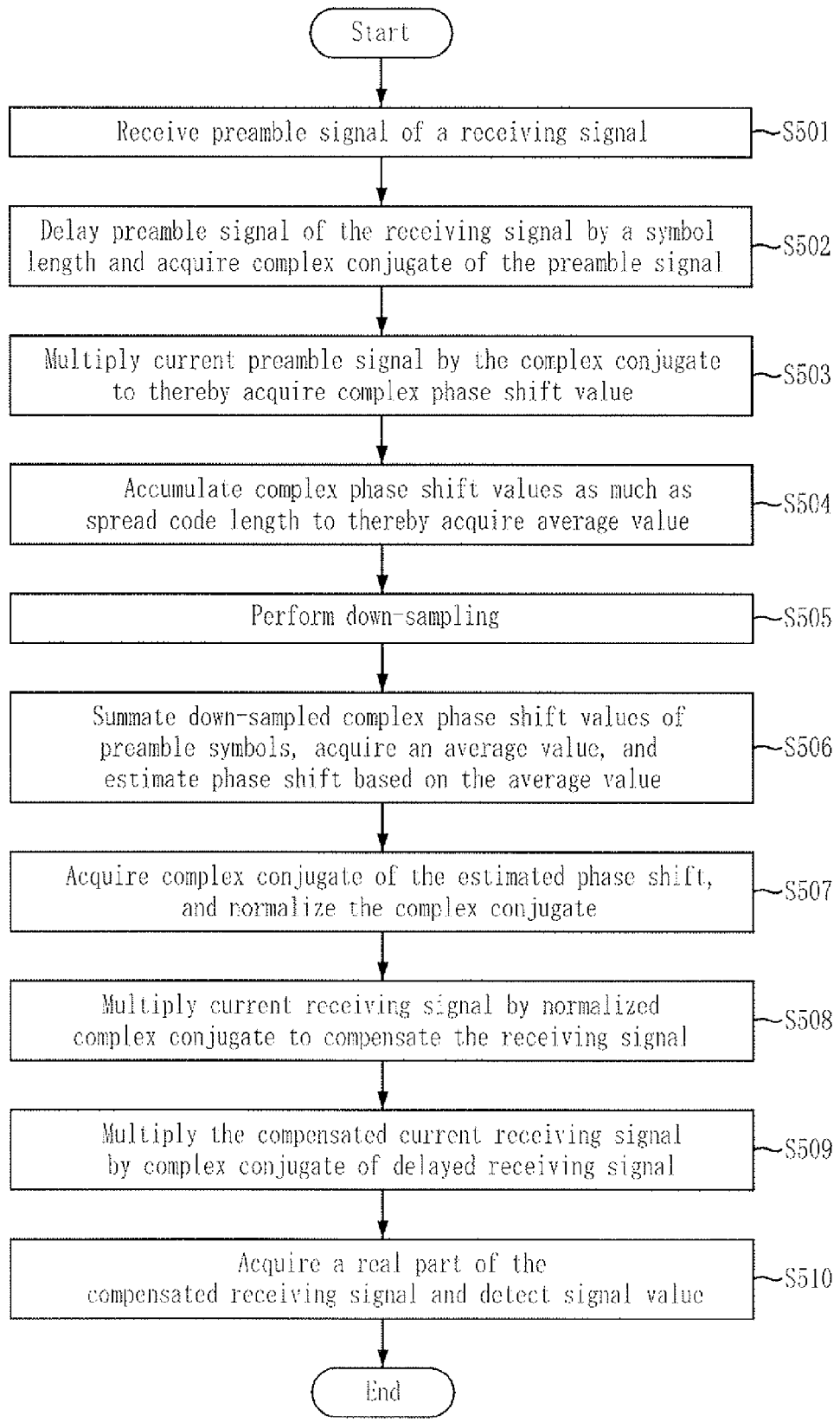
FIG. 5 is a flowchart illustrating a carrier frequency recovering method performed based on phase shift prior to differential decoding in accordance with an embodiment of the present invention.

FIG. 5 is a flowchart illustrating a carrier frequency recovering method performed based on phase shift prior to differential decoding in accordance with an embodiment of the present invention.

According to the embodiment of the present invention, the carrier frequency recovering method is performed prior to differential decoding based on phase shift and it is composed of a phase shift estimation process where phase shift caused by frequency offset is estimated based on a preamble signal received through multiple paths, a signal compensation process where a receiving signal is compensated before it is differentially decoded based on the estimated phase shift, and a signal recovery process where the compensated signal is recovered.

Referring to FIG. 5, a preamble symbol of a receiving signal is received first in step S501, and the preamble symbol is delayed as much as a symbol length and a complex conjugate of the preamble symbol is acquired in step S502.

In step S503, the complex conjugate of the preamble symbol is multiplied by a currently received preamble symbol to thereby produce a complex phase shift value. In other words, when the current preamble symbol is multiplied by the complex conjugate of the preamble symbol, only the effect on a phase shift remains in the form of a complex value.

The average of complex phase shift values is acquired in a preamble duration, and a phase shift is estimated based on the average in the steps S504 to S507. In step S504, complex phase shift values are accumulating as long as a spread code and an average value thereof is acquired in the step S504. In the step S505, the average complex phase shift value is down-sampled to decrease a symbol clock rate as many as the length of the spread code, i.e., the number of chips of the spread code.

Subsequently, in the step S506, the down-sampled complex phase shift values are accumulating as many as the preamble symbols, i.e., a preamble duration, and an average value thereof is acquired, and a phase shift value is estimated base don the average value. In the step S507, a complex conjugate of the estimated phase shift value is acquired and normalized.

In step S508, a currently inputted receiving signal is compensated by multiplying the current receiving signal by the normalized complex conjugate of the estimated phase shift value.

In step S509, the compensated current receiving signal is multiplied by the complex conjugate of the delayed receiving signal to be differentially decoded. Then, in step S510, a real part of the compensated receiving signal is extracted and the value of the demodulated signal is determined, that is, whether 0 or 1.

As described above, since the carrier frequency recovering apparatus suggested in the embodiment of the present invention recovers data, or receiving signals, based not on a frequency offset but on an estimated phase shift, it does not require a block having a high hardware complexity, such as arctan(x) for estimating the frequency offset value.

Differently from a conventional technology that cannot estimate a phase shift when a frequency offset is larger than the symbol rate because the phase shift goes over $2\pi$, the method of the present invention can estimate a phase shift regardless of the frequency offset value because the phase shift is estimated only based on modulo $2\pi$.

The estimated phase shift $u_\varepsilon$ can be expressed as Equation 8.

$$u_\varepsilon = E\{r_k r_{k-M}^*\}^* \quad \text{Equation 8}$$
$$= E\{s_k s_{k-M}^* e^{j2\pi M \Delta f T_c} + n_k s_{k-M}^* e^{(-j2\pi(k-M)\Delta f T_c + \theta)} +$$
$$s_k n_{k-M}^* e^{(j2\pi k \Delta f T_c + \theta)} + n_k n_{k-M}^*\}$$
$$= \left\{ \frac{1}{L \cdot M} \sum_{n=0}^{L-1} \sum_{k=nM}^{nM+M-1} e^{j2\pi \Delta \hat{f} T_s} \right\}^*$$
$$\approx e^{-j2\pi \Delta \hat{f} T_s}$$

where L denotes the number of symbols of a preamble;
M denotes the number of chips;
$r_k$ is a receiving signal;
M is the length of a spread code;
$s_k$ is a resulting chip-rate sequence;

$\Delta f$ is a frequency offset value applied between a transmitter and a receiver;
$T_c$ is a time interval between chip sequences;
$T_s$ is a symbol time interval;
$n_k$ is a sampled version of complex Additive White Gaussian Noise (AWGN);
$\theta$ is an initial phase value uniformly distributed from 0 to $2\pi$; and
$n_{k-M}$ is a noise signal of $n_k$ having a time interval of M.

In short, the estimated phase shift has a frequency offset value applied to a channel through the process of the present invention.

Figure 6:
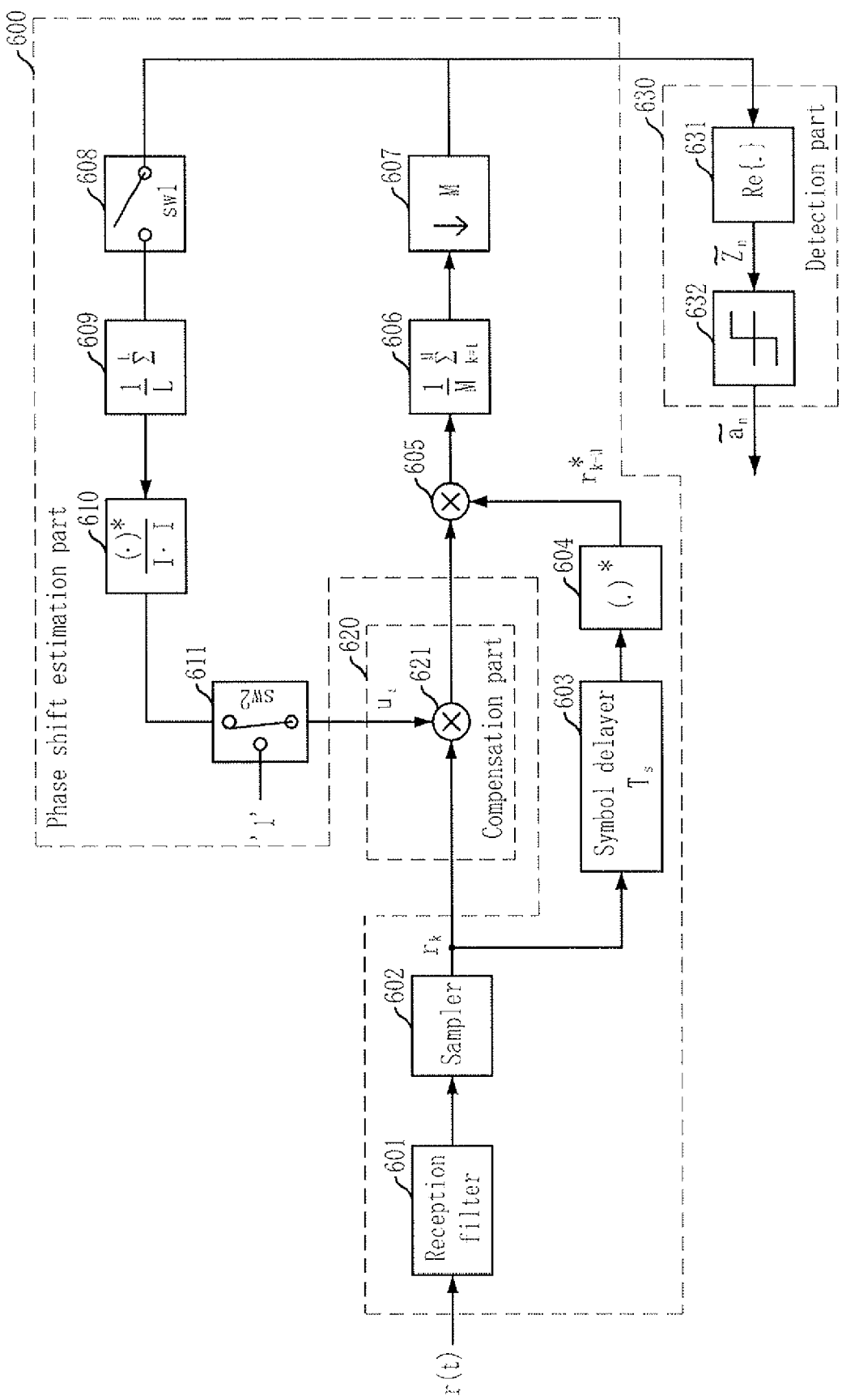
FIG. 6 is a block diagram illustrating a configuration of an apparatus for recovering a carrier frequency based on phase shift prior to differential decoding in accordance with an embodiment of the present invention.

FIG. 6 is a block diagram illustrating a configuration of an apparatus for recovering a carrier frequency based on phase shift prior to differential decoding in accordance with an embodiment of the present invention. It shows a structure of a receiver adopting the carrier frequency recovering apparatus.

Referring to FIG. 6, the carrier frequency recovering apparatus which recovers carrier frequency based on phase shift prior to differential decoding includes a phase shift estimation part 600, a compensation part 620, and a recovery part 630. The phase shift estimation part 600 estimates phase shift caused by a frequency offset. The compensation part 620 compensates a receiving signal prior to differential decoding based on the phase shift acquired in the phase shift estimation part 600. The recovery part 630 recovers the compensated receiving signal acquired in the compensation part 620.

Referring to FIG. 6, a signal received in the receiver passes through a reception filter 601, and sampled in a sampler 602. The reception filter 601 may be a differential matched filter. The differential matched filter performs symbol timing tracking onto the receiving signal, which is expressed as Equation 9.

$$corr = \left| \int r(t) s^*(t) \right| = \left| \sum_{n=0}^{N-1} r_k(n) r_k^*(n-D) s^*(n) s(n-D) \right| \quad \text{Equation 9}$$

where r(t) is a receiving signal;
s(t) is a reference signal;
s(n): the sampled version of a reference signal corr denotes a correlation value;
$r_k(n)$ is a digitalized receiving signal; and
D is a chip period delay.

To describe the operation of the differential matched filter in detail with reference to the Equation 9, a correlation value between a reference signal and a one-chip-delayed reference signal is acquired and filtered. Subsequently, symbol timing tracking is performed onto the filtered correlation value based on the highest one among symbol Signal-to-Noise (SNR) values.

The preamble symbols of a receiving signal that have passed through the reception filter 601 and the sampler 602 are delayed as much as the symbol length. The delayed preamble symbols are transformed into a complex conjugate in a conjugator 604 and multiplied by currently received preamble symbols in a first multiplier 605, which outputs a complex phase shift value as a result of the multiplication.

Since the values of preamble symbols are the same, the output value of the first multiplier 605 reflects only the phase shift. The output values of the first multiplier 605, i.e., complex phase shift values, are accumulated as many as the chips of a spread code, i.e., the length of a spread code, and an average there of is acquired. The average value is down-sampled by M folds in a down-sampler 607, and decreases the symbol clock rate by the length of the spread code.

Subsequently, the down-sampled complex phase shifts are accumulating as many as the symbol length of the preamble and an average thereof is acquired in a second average calculator 609 to thereby estimate a phase shift value. An average of the estimated phase shift values is transformed into a complex conjugate and normalized into a signal size of 1 in a normalizer 610 before it is multiplied by a currently inputted receiving signal. Therefore, the complex conjugate, which is the phase shift value, is divided by the absolute value of an output signal and normalized.

For the phase shift estimation and normalization, a first estimation switch 608 and a second estimation switch 611 operate as Equation 10.

$$1st\ switch = \begin{cases} on: & n = 0, 1, \ldots, L-1 \\ off: & otherwise \end{cases}$$

$$2nd\ switch = \begin{cases} off: & n = 0, 1, \ldots, L-1 \\ on: & otherwise \end{cases}$$

Equation 10 where L is the number of preamble symbols.

While the preamble symbols are received, the first estimation switch 608 is turned on and transmits preamble data to the second average calculator 609. The second estimation switch 611 is turned off and supplies a value of '1' to a second multiplier 621 to thereby give no influence onto the receiving signal. Meanwhile, when the preamble symbols are all received, the first estimation switch 608 is turned off, and the second estimation switch 611 is turned on to compensate the currently inputted receiving signal for the estimated phase shift.

As described above, the currently inputted receiving signal is delayed as much as the symbol length in the symbol delayer 603 and a complex conjugate of the delayed receiving signal is acquired in the conjugator 604. Also, the current receiving signal is multiplied by the complex conjugate of the estimated phase shift in the second multiplier 621 to be compensated for the phase shift.

The compensated current receiving signal, which is compensated in the second multiplier 621, is multiplied again by the complex conjugate of a delayed signal that has passed through the symbol delayer 603 and the conjugator 604 in the first multiplier 605. The compensated signal outputted from the first multiplier 605 passes through a first average calculator 606 and the down-sampler 607. The real part of the compensated signal outputted from the down-sampler 607 is extracted and the value of the demodulated signal is determined in a signal value detector 632.

When the noise effect is excluded and the symbols of the current receiving signal which is compensated for the complex conjugate of the delayed symbols and the phase shift are demodulated, the result can be expressed as the following Equation 11.

$$z_n = \frac{1}{M} \sum_M \left( s_k e^{-j2\pi\Delta f T_s} \cdot s^*_{k-M} e^{j2\pi M \Delta f T_c} \right) = \hat{a}_n$$

Equation 11 where $z_n$ is a decision variable after differential decoding;
M is the length of a spread code;
$s_k$ is a resulting chip-rate sequence;

$\Delta f$ is a frequency offset value applied between a transmitter and a receiver;
$T_s$ is a symbol time interval;
$T_c$ is a time interval between chip sequences; and
$\hat{a}_n$ is a finally demodulated information signal.

Figure 7:
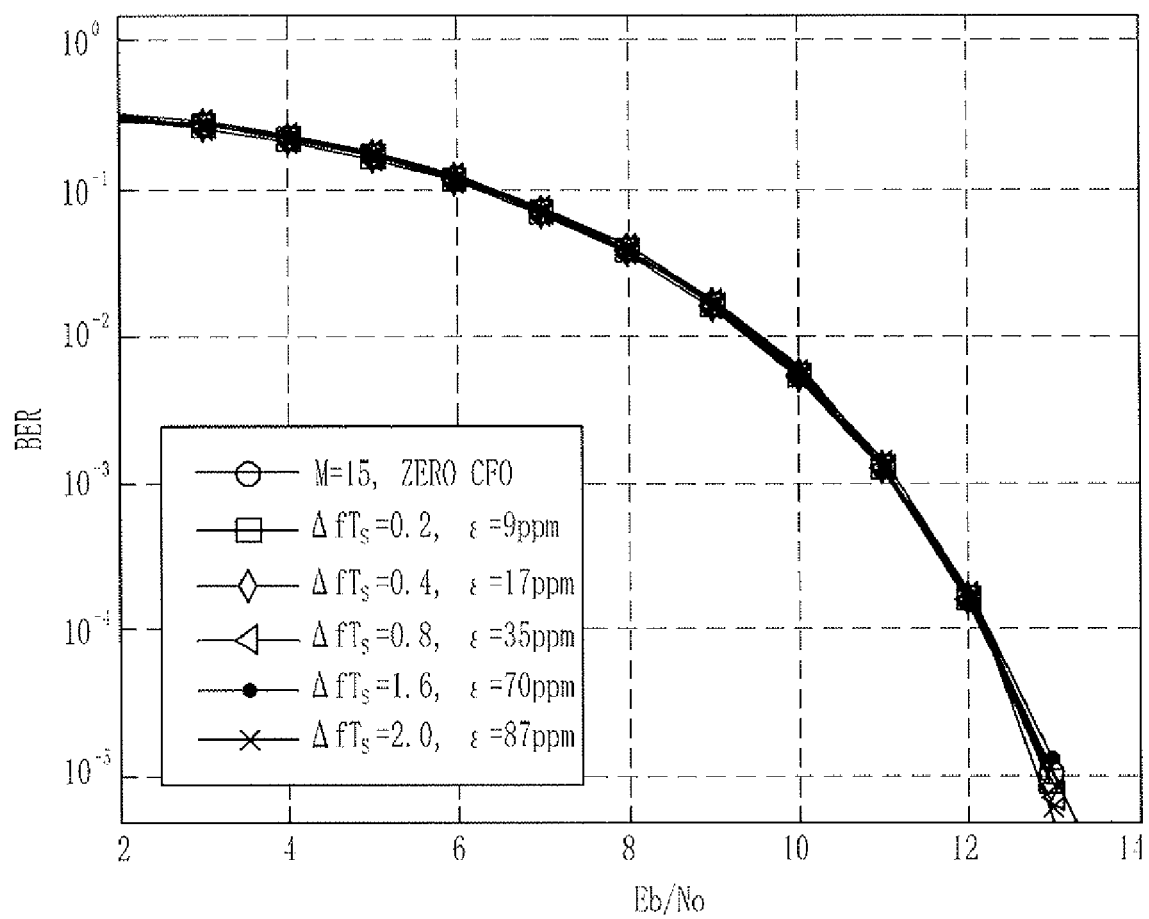
FIG. 7 is a graph showing a simulation result of a receiver employing the carrier frequency recovering apparatus for recovering a carrier frequency prior to differential decoding.

FIG. 7 is a graph showing a simulation result of a receiver employing the carrier frequency recovering apparatus for recovering a carrier frequency prior to differential decoding. The graph shows the reception performance of the DSSS DBPSK system employing the frequency recovering apparatus for recovering a frequency based on carrier frequency offset prior to differential decoding.

Herein, the experimental conditions were the same as those of FIG. 4. As shown in FIG. 7, when the averaged frequency offset is changed from 9 ppm to 87 ppm, the performance was uniform regardless of the frequency offset value.

According to another embodiment of the present invention, carrier frequency recovery performed after differential decoding based on phase shift will be described hereinafter with reference to FIGS. 8 to 10.

In the carrier frequency recovery performed after differential decoding, too, an averaged phase shift value is estimated based on the preamble symbols of receiving signals, which is the same method as in the above described carrier frequency recovery performed prior to differential decoding. What is different is that the estimated phase shift value is not multiplied by a currently inputted receiving signal and the phase shift is compensated at the end of the differential decoding. The compensation after differential decoding makes it possible to realize a system without a block for normalizing the value of the averaged phase shift values by the size of '1'.

Figure 8:
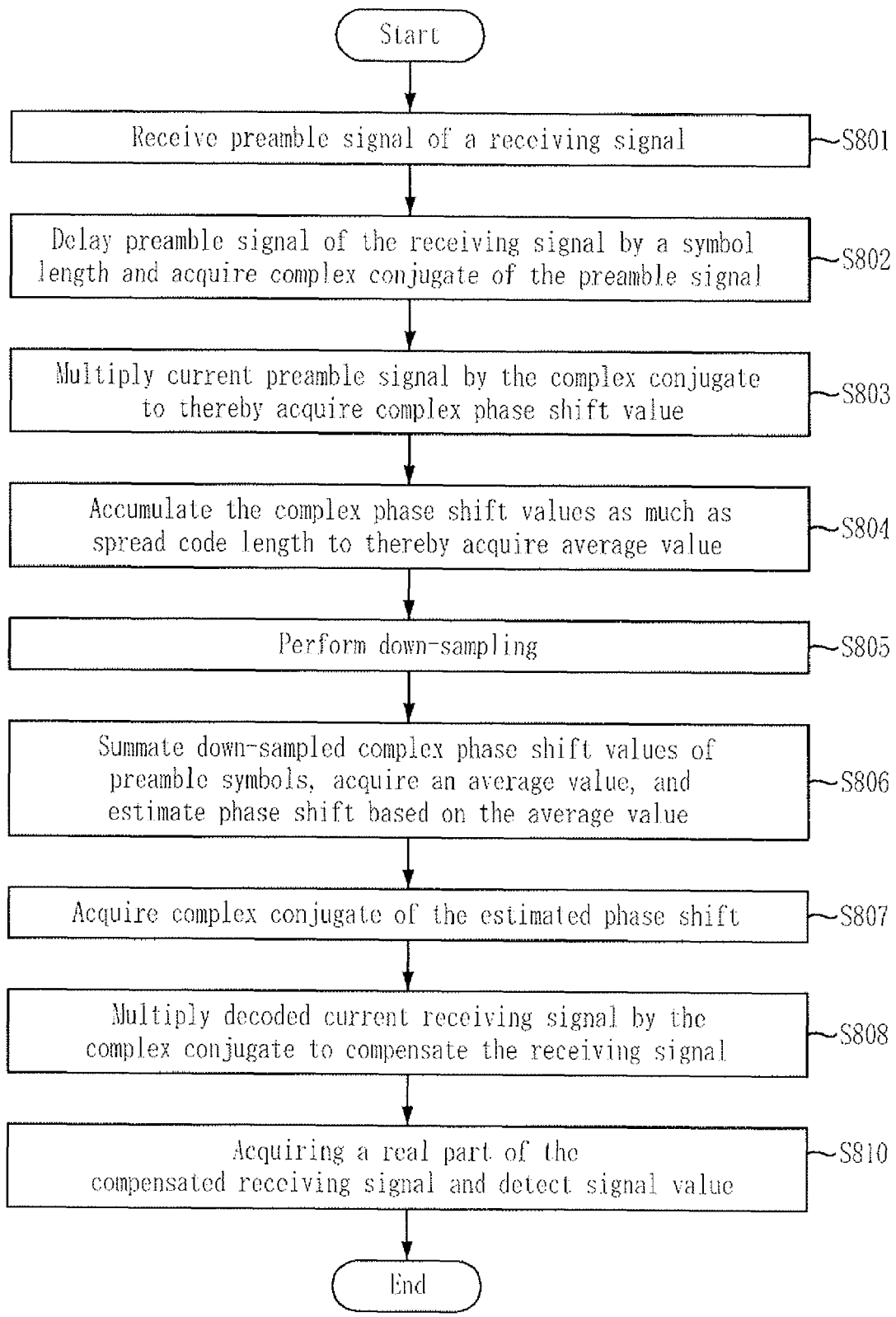
FIG. 8 is a flowchart describing a method for recovering a carrier frequency based on phase shift after differential decoding in accordance with an embodiment of the present invention.

FIG. 8 is a flowchart describing a method for recovering a carrier frequency based on phase shift after differential decoding in accordance with an embodiment of the present invention.

The carrier frequency recovering method performed after differential decoding based on the phase shift, which is suggested in the embodiment of the present invention, includes a phase shift estimation process, a decoded signal compensation process, and a compensated signal recovering process. Phase shift caused by frequency offset is estimated based on preamble symbols transmitted through multiple paths in the phase shift estimation process. In the decoded signal compensation process, differential decoding is performed and then the decoded signal is compensated based on the estimated phase shift acquired in the phase shift estimation process. In the compensated signal recovering process, the compensated signal acquired in the decoded signal compensation process is recovered.

To describe the carrier frequency recovering method in detail with reference to FIG. 8, preamble symbols of a receiving signal, i.e., a preamble signal, is received in step S801. The preamble signal of the receiving signal is delayed as much as a symbol length, and a complex conjugate of the preamble signal is acquired in step S802.

In step S803, a complex phase shift is acquired by multiplying a currently received preamble signal by the complex conjugate of the delayed preamble signal. In other words, when the currently received preamble signal is multiplied by the complex conjugate of the delayed preamble signal, the result is that only the influence of the phase shift remains in the form of the complex number.

The average of complex phase shifts is acquired in the preamble symbols and a phase shift value is estimated in steps S804 to S807. To be specific, the complex phase shift values, each of which is acquired from the multiplication, are accumulating as many as the length of a spread code, and the average thereof is acquired in the step S804. In the step S805, down sampling is carried out to decrease the symbol clock rate as many as the length of the spread code. In the step S806, the down-sampled complex phase shift values are accumulating as many as the length of preamble symbols, i.e., throughout the preamble duration, and the average thereof is acquired and used for estimating a phase shift value.

In the step S807, a complex conjugate of the estimated phase shift value is acquired. In step S808, the decoded current receiving signal is compensated by multiplying it by the complex conjugate of the phase shift value. In step S809, the real part of the compensated signal is extracted and the value of the demodulated signal is detected.

Figure 9:
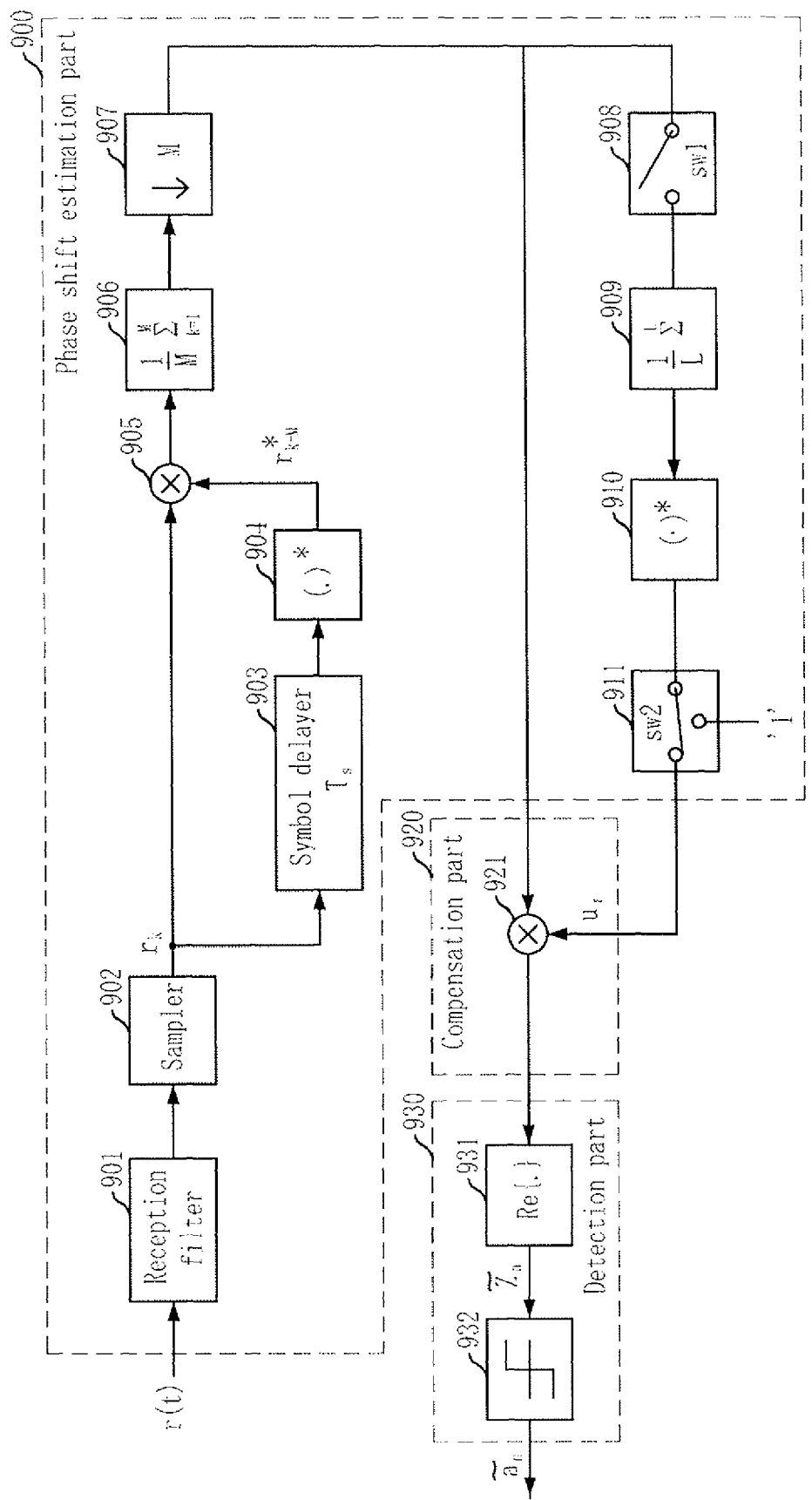
FIG. 9 is a block diagram showing a configuration of an apparatus for recovering a carrier frequency based on phase shift after differential decoding in accordance with an embodiment of the present invention.

FIG. 9 is a block diagram showing a configuration of an apparatus for recovering a carrier frequency based on phase shift after differential decoding in accordance with an embodiment of the present invention. It shows a structure of a receiver employing a carrier frequency recovering apparatus that recovers a carrier frequency posterior to differential decoding.

Referring to FIG. 9, the carrier frequency recovering apparatus for recovering a carrier frequency based on a phase shift after differential decoding includes a phase shift estimation part 900, a compensation part 920, and a recovery part 930. The phase shift estimation part 900 estimates a phase shift value influenced by a frequency offset by using a preamble signal received through multiple paths. The compensation part 920 compensates a differentially decoded signal based on the estimated phase shift value acquired in the phase shift estimation part 900. The recovery part 930 recovers the compensated signal acquired in the compensation part 920.

To be more specific, a receiving signal received in a receiver passes through a reception filter 901 and sampled in a sampler 902. Herein, the reception filter 901 may be a differential matched filter. The differential matched filter performs symbol timing tracking onto the receiving signal, which is shown in the Equation 9.

To describe the operation of the differential matched filter with reference to the Equation 9, a correlation value between a reference signal and a one-chip-delayed reference signal is acquired, and a correlation value between the receiving signal and a one-chip-delayed receiving signal is acquired. The two correlation values are filtered. The differential matched filter performs the symbol timing tracking based on the highest Signal-To-Noise Ratio (SNR) among the SNR values.

The preamble signal of the receiving signal that has passed through the reception filter 901 and the sampler 902 is delayed by a symbol length in a symbol delayer 903. The complex conjugate of the delayed preamble signal is acquired in a conjugator 904 and multiplied by a currently received preamble signal. As described above, currently inputted receiving signals are multiplied by the complex conjugate of a delayed signal and it is differentially demodulated. A complex phase shift value is outputted from the multiplication in a multiplier 905. Since the symbols of a preamble signal are the same, only the influence of the phase shift remains in the output value of the multiplier 905. The output values of the multiplier 905, which are complex phase shift values, are accumulating as many as the length of a spread code, and an average thereof is acquired in a first average calculator 906. A down-sampler 907 performs down-sampling onto the average value by M folds to thereby decrease the symbol clock rate as many as the length of the spread code.

Subsequently, a second average calculator 909 accumulates the down-sampled complex phase shift as many as the symbol length of the preamble signal, i.e., in the preamble symbol section, acquires an average thereof, and estimates a phase shift value based on the average. A conjugator 910 acquires a complex conjugate of the estimated phase shift average value to be multiplied by a decoded signal.

A first estimation switch 908 and a second estimation switch 911 are operated as expressed in the Equation 10 for the estimation of phase shift.

While a preamble signal is received, the first estimation switch, the first estimation switch 908 is turned on and transmits preamble data to the second average calculator 909. The second estimation switch 911 is turned off and supplies a value of '1' Lo a second multiplier 921 to thereby give no influence onto the receiving signal. Meanwhile, when the preamble symbols are all received, the first estimation switch 908 is turned off, and the second estimation switch 911 is turned on to compensate the currently inputted receiving signal for the estimated phase shift.

The real part of the compensated signal is extracted in a real part extractor 931, and the value of the demodulated signal is determined in the signal value detector 932. The receiver employing the carrier frequency recovering apparatus for recovering a frequency after differential decoding compensates signals not on the chip basis but on the symbol basis.

Therefore, it can realize a low-rate wireless communication network and since it does not have a normalization block for normalizing estimated values, it is more efficient in the respect of hardware than the carrier frequency recovering apparatus for recovering a frequency prior to differential decoding.

Figure 10:
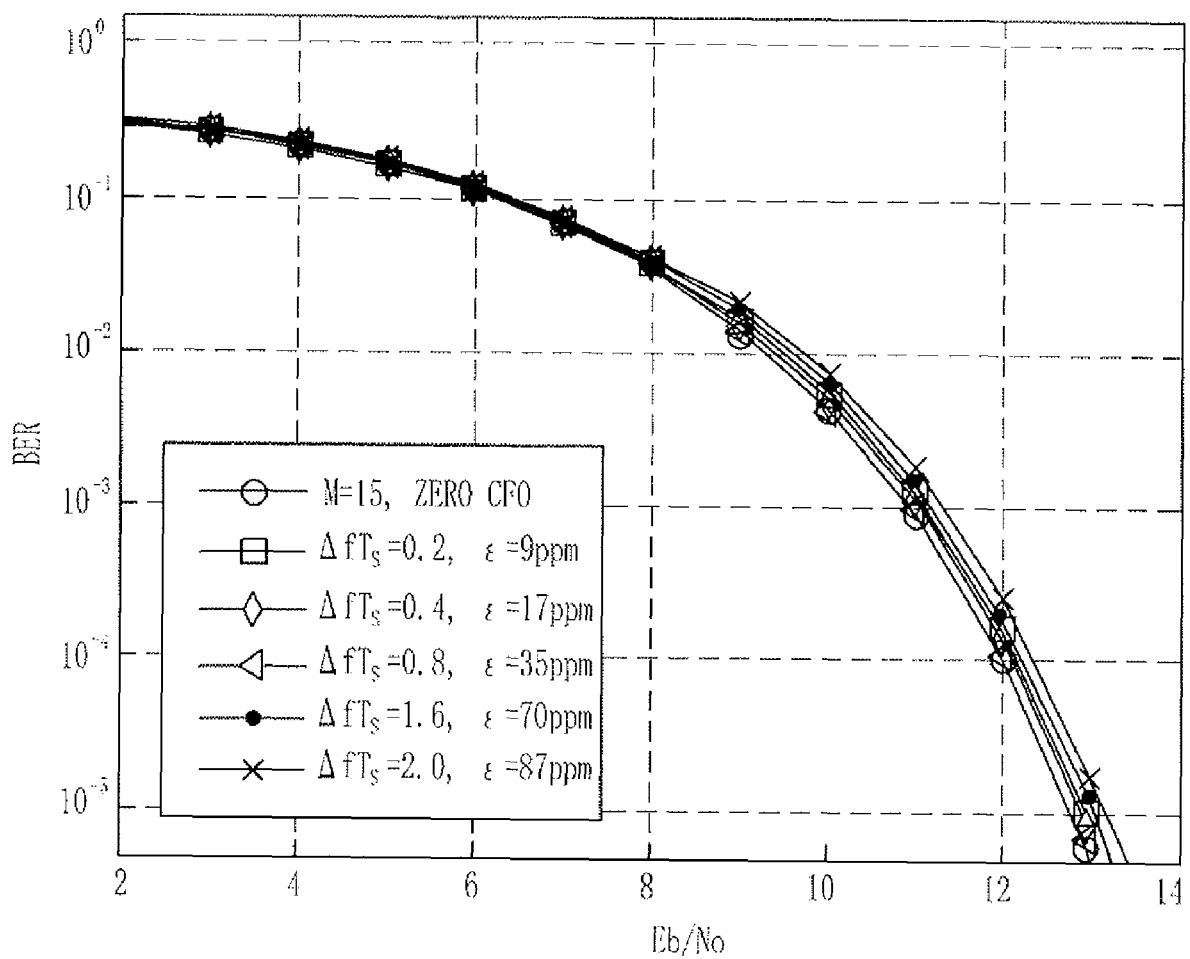
FIG. 10 is a graph showing a simulation result of a receiver employing the carrier frequency recovering apparatus for recovering a carrier frequency after differential decoding.

FIG. 10 is a graph showing a simulation result of a receiver employing the carrier frequency recovering apparatus for recovering a carrier frequency after differential decoding. It shows performance of a receiver adopting the carrier frequency recovering apparatus for recovering a frequency based on carrier frequency offset after differential decoding in a DSSS DBPSX system.

The experimental conditions are the same as those of FIG. 7. Referring to FIG. 10, normalized frequency offsets were varied from 9 ppm to 87 ppm and tested. The result was that uniform performance was acquired regardless of the frequency offset value. However, the performance was deteriorated by about 0.5 dB in proportion to the frequency offset value in a high signal-to-noise ratio (SNR) region.

Figure 11:
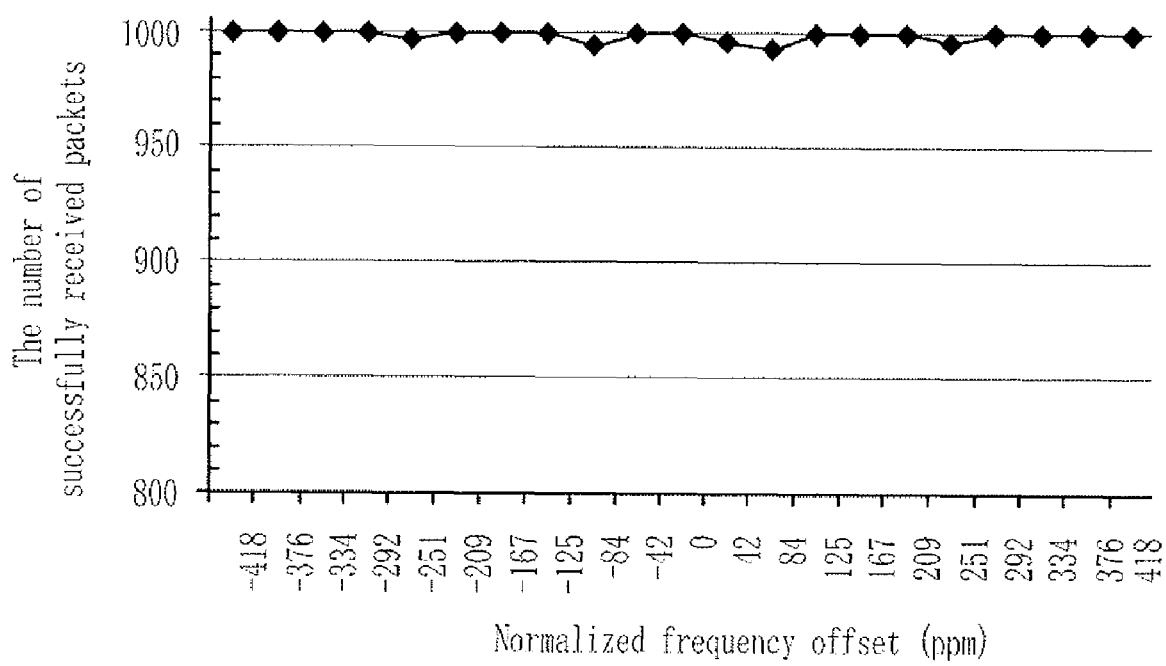
FIG. 11 is a graph showing a measurement result of a receiver employing the carrier frequency recovering apparatus for recovering a carrier frequency after differential decoding.

FIG. 11 is a graph showing an experimental measurement result of a receiver employing the carrier frequency recovering apparatus for recovering a carrier frequency after differential decoding. It shows an experimental result of hardware realized by applying the carrier frequency recovering apparatus for recovering a frequency after differential decoding to a low-rate Wireless Personal Area Network (LR-WPAN) which is defined in the IEEE 802.15.4 Specification.

The graph of FIG. 11 shows a frequency offset experiment result using chip sets, which is realized according to an embodiment of the present invention. The graph is obtained by measuring the number of successfully received packets with no erroneous bit, when a frequency offset was generated by varying an oscillator of a receiver while fixing an oscillator of a transmitter at 915.989.339 Hz and 1000 packets were transmitted. In the graph of FIG. 11, the Packet Error Rate (PER) satisfies 1% in a wider range, which is from −418 ppm to 418 ppm, than ±80 ppm, which is required by the IEEE 802.15.4 LR WPAN standard. The actual experiment produced a frequency offset of over ±500 ppm, which was very excellent.

The present invention recovers a carrier frequency base don a phase shift caused by a frequency offset. Therefore, it is possible to perform demodulation without deteriorating performance and with no regard to the frequency offset value, although a frequency offset value is larger than a symbol rate and minimize the structural complexity.

That is, a frequency recovery performed prior to differential decoding and a frequency recovery performed after differential decoding, which are suggested in the embodiments of the present invention, can recover a carrier frequency based on an average phase shift value. Thus, the carrier frequency can be recovered without deteriorating performance even if a frequency offset exceeds a symbol rate. Also, since the circuit can be realized in a simple structure, a frequency recovering apparatus can be realized in a small area with a low power.

The apparatus and method of the present invention can estimate and compensate for a frequency offset over ±500 ppm without deteriorating performance. Since the frequency recovering apparatus can be simply realized, it requires small power consumption, improves the cycle-life of a battery, and maintains performance accurately. Therefore, it is appropriate for a row-rate Wireless Personal Area Network (LR-WP) system that has a large frequency offset tolerance range and requires low costs and low structural complexity.

While the present invention has been described with respect to the specific embodiments, it will be apparent to those skilled in the art that various changes and modifications may be made without departing from the spirit and scope of the invention as defined in the following claims.

What is claimed is:

1. An apparatus for recovering a carrier frequency based on phase shift of a receiving signal, comprising:
  a phase shift estimation means for differentially decoding and down-sampling a preamble signal of the receiving signal into a currently decoded signal and for estimating a phase shift value of the preamble signal using a complex conjugate of the currently decoded signal, wherein the phase shift estimation means includes an averaging down-sampler for summating complex phase shift values acquired in a first multiplication unit as many as a the length of a spread code, for acquiring an average of the complex phase shift values as the currently decoded signal, and for performing the down-sampling to decrease a symbol clock rate as many as the length of the spread code;
  a compensation means for compensating the currently decoded signal based on the complex conjugate of the currently decoded signal which corresponds to the estimated phase shift value acquired in the phase shift estimation means after differential decoding; and
  a recovery means for recovering the compensated signal;
  wherein the compensation means includes multiplication unit for compensating the currently decoded signal by multiplying the currently decoded signal by the complex conjugate of the currently decoded signal.

2. The apparatus of claim 1, wherein the phase shift estimation means further includes:
  a receiving unit for receiving preamble symbols of the receiving signal, which are referred to as the preamble signal;
  a delaying and conjugating unit for delaying the preamble signal of the receiving signal by a symbol length and acquiring a complex conjugate of the delayed preamble signal;
  the first multiplication unit for acquiring the complex phase shift values of the receiving signal by multiplying the complex conjugate of the delayed preamble signal, which is acquired in the delaying and conjugating unit, by a currently received preamble signal; and
  a phase shift estimation unit for acquiring an average of complex phase shift values of the preamble symbols that are acquired in the first multiplication unit and for estimating the phase shift value based on the average.

3. The apparatus of claim 2, wherein the phase shift estimation unit further includes:
  a switch for switching on/off down-sampled complex phase shift values of the preamble symbols;
  a phase shift estimator for summating down-sampled complex phase shift values of the preamble symbols, acquiring an average thereof, and estimating the phase shift value based on the average; and
  a conjugator for acquiring a complex conjugate of the estimated phase shift value.

4. The apparatus of claim 3, wherein the switch includes:
  a first switch disposed in an input part of the phase shift estimation unit; and
  a second switch disposed in an output part of the phase shift estimation unit,
where the switch is operated to estimate a phase shift value only for the preamble symbols based on an equation expressed as:

$$1st \text{ switch} = \begin{cases} \text{on:} & n = 0, 1, \ldots, L-1 \\ \text{off:} & \text{otherwise} \end{cases}$$

$$2nd \text{ switch} = \begin{cases} \text{off:} & n = 0, 1, \ldots, L-1 \\ \text{on:} & \text{otherwise} \end{cases}$$

wherein L being the number of preamble symbols.

5. The apparatus of claim 3, wherein the receiving unit includes:
  a differential matched filter for performing symbol timing tracking onto the receiving signal.

6. The apparatus of claim 5, wherein the differential matched filter acquires a first correlation value between a reference signal and a one-chip-delayed reference signal, acquires a second correlation value between a receiving signal and a one-chip-delayed receiving signal, performs filtering, and performing the symbol timing tracking based on the highest Signal-to-Noise Ratio (SNR) value among SNR values.

7. A method for recovering a carrier frequency based on phase shift of a receiving signal, comprising the steps of:
  a) differentially decoding and estimating a phase shift value caused by a frequency offset based on a received preamble signal of the receiving signal into a down sampled currently decoded signal and providing a complex conjugate of the estimated phase shift value, wherein the phase shift estimation step a) includes the steps of:
  a1) receiving preamble symbols of a receiving signal, which are referred to as the preamble signal;
  a2) delaying the preamble signal of the receiving signal by a symbol length and acquiring a complex conjugate of the preamble signal as the currently decoded signal;
  a3) acquiring a complex phase shift value by multiplying a currently inputted preamble signal by the complex conjugate; and
  a4) estimating a phase shift value as the currently decoded signal by acquiring an average of the complex phase shift values of the preamble symbols such that the phase shift estimation step a4) includes the steps of:
  a4-1) accumulating the complex phase shift values as many as the length of a spread code, acquiring an average thereof, and performing down-sampling to decrease a symbol clock rate as many as the length of the spread code;

a4-2) summating complex phase shift values of the down-sampled signal of the preamble symbols, acquiring an average thereof, and estimating a phase shift based on the average; and a4-3) acquiring a complex conjugate of the estimated phase shift value;

b) compensating the decoded signal based on the complex conjugate of the estimated phase shift value after differential decoding; and c) recovering the compensated signal;

wherein the step b) compensates the currently decoded signal by multiplying the currently decoded signal by the complex conjugate of the phase shift value estimated in the step a).

* * * * *